June 29, 1965
J. BYRNE ETAL
3,192,411
PULSE GENERATOR USING A DUAL FREQUENCY OSCILLATOR TO BOTH DEVELOP AND SWITCH HIGH VOLTAGE
Filed July 3, 1961
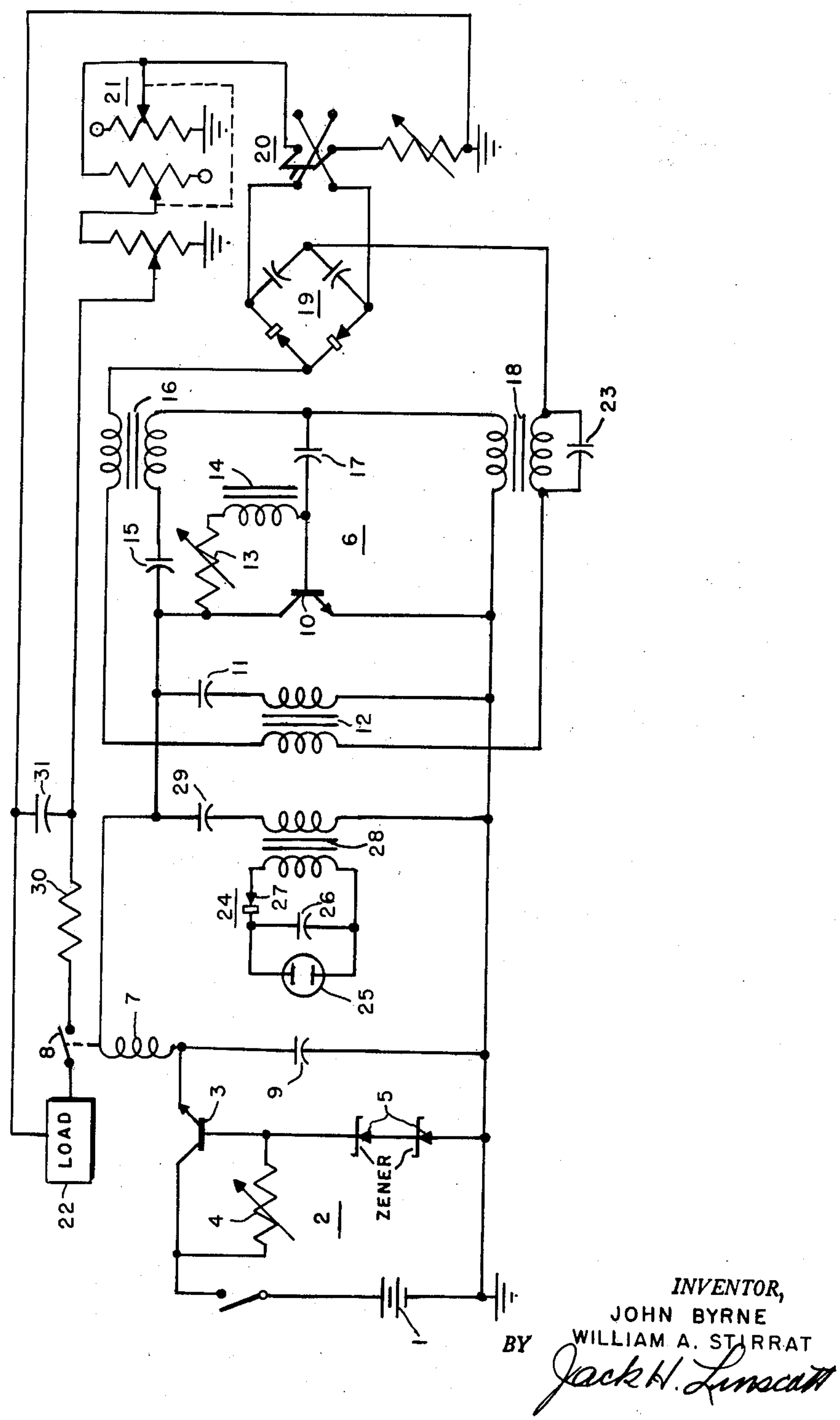
INVENTOR,
JOHN BYRNE
WILLIAM A. STIRRAT
BY Jack H. Linscott
ATTORNEY.

United States Patent Office 3,192,411

Patented June 29, 1965

3,192,411

PULSE GENERATOR USING A DUAL FREQUENCY OSCILLATOR TO BOTH DEVELOP AND SWITCH HIGH VOLTAGE

John Byrne, Belford, and William A. Stirrat, Neptune City, N.J., assignors to the United States of America as represented by the Secretary of the Army Filed July 3, 1961, Ser. No. 121,790
7 Claims. (Cl. 307—107)
(Granted under Title 35, U.S. Code (1952), sec. 266)

The invention described herein may be manufactured and used by or for the Government, for governmental purposes, without the payment of any royalty thereon.

This invention relates to pulse generators and, more particularly, to a new transistorized pulse generator operating from a low voltage D.-C. supply and using a single transistor to both develop and switch the high voltage.

Prior to this invention, transistorized pulse generating systems using a D.-C. supply were generally characterized by fairly complex systems, e.g., using oscillator and amplifier arrangements to provide the high voltage necessary and using separate multivibrators or oscillators and amplifiers to drive the switch coil. Among the highly undesirable features of such pulse generating systems are high power consumption and the use of several transistors which increases the complexity and expense of the systems.

In a preferred embodiment of this invention, a dual-frequency oscillator using a single transistor is operated from a stable low-voltage D.-C. supply to provide high and low frequency outputs simultaneously. The high-frequency oscillations are supplied first to voltage step-up transformers next to a rectifying and multiplying circuit and then to a suitable load through a switch which is operated by the low-frequency output of the oscillator. The action of this switch then provides the desired high-voltage pulses to the load at this low-frequency.

Accordingly, it is an object of this invention to provide a simple transistorized pulse generating system.

Another object of this invention is to provide a pulse generating system having low power consumption.

Another object of this invention is to provide a transistor pulse generating system using a single transistor to deliver and switch the desired pulse voltage.

Another object of this invention is to provide a pulse generating system for supplying high-voltage pulses from a low-voltage source which does not use amplifiers.

Another object of this invention is to provide a compact pulse generating system having a minimum number of parts.

A further object is to provide an efficient pulse generating system.

Other objects and features of this invention will become apparent to those skilled in the art upon consideration of the following description taken in conjunction with the drawing, the single figure of which is a circuit diagram of a preferred embodiment of the invention.

Referring now to the drawing there is shown a source of low-voltage D.-C. depicted as a battery 1, the output of which is regulated by a conventional voltage regulator 2 comprising a transistor 3, variable resistance 4, and Zener diodes 5 to provide a stable source of D.-C. voltage. This stable D.-C. voltage is supplied to a dual-frequency transistor oscillator 6 through the operating or energizing coil 7 of a switch 8. An isolating capacitor 9 is connected across the output of voltage regulator 2.

Oscillator 6 comprises an NPN junction transistor 10, the emitter-collector path of which is connected across the stabilized D.-C. input. A capacitor 11 and the primary winding of a step-up transformer 12 are connected in series across the emitter-collector of transistor 10. Suitable operating bias is provided for the base of transistor 10 by means of a variable resistor 13 and an inductance 14 connected in series between the collector and base of transistor 10. A capacitor 15 and the primary winding of a step-up transformer 16 are connected in series between the collector and base of transistor 10 through a base isolating capacitor 17. The primary winding of a third step-up transformer 18 is connected between the emitter of transistor 10 and the junction between capacitor 17 and transformer 16.

The secondary windings of step-up transformers 12, 16, and 18 are connected in series with one another and with the input terminals of a conventional voltage rectifying and doubling circuit 19. The output of circuit 19 is supplied through a double-throw double-pole switch 20, variable attenuator and compensation circuit 21, a resistance 30, and switch 8 to a suitable load 22. A capacitor 31 is connected between load 22 and the junction of resistance 30 and circuit 21 to act as a filter to R.F. frequencies. A capacitor 23 is connected across the secondary winding of transformer 18 to prevent the oscillator from going into unusually high frequencies. An indicator circuit 24 comprising a neon lamp 25, capacitor 26, and rectifier 27 may also be coupled to the output of transistor oscillator 6 through a transformer 28, the primary winding of which is connected in series with a blocking capacitor 29 across the emitter-collector terminals of transistor 10.

The operation of the system will now be described. The combination of battery 1 and conventional voltage regulator 2 provides a stable source of D.-C. voltage in a manner which is well-known in the art. Isolating capacitor 9 has a high capacitance and prevents regulator circuit 2 from acting as a part of oscillator circuit 6. The stabilized D.-C. voltage from regulator 2 passes through energizing coil 7 of switch 8 to oscillator 6. Coil 7 presents a high impedance to the system looking back at the battery. After passing through coil 7, the stabilized D.-C. input is supplied directly to the emitter-collector path of transistor 10 in oscillator 6. A portion of this D.-C. supply is fed to the base of transistor 10 through variable resistor 13 and inductance 14 to provide operating bias for transistor 10. The amount of bias supplied to the transistor may be regulated by changing the setting of resistor 13; and inductance 14 keeps the A.-C. voltage, and thus the A.-C. energy dissipation, across resistor 13 small.

Oscillator 6 is designed in accordance with the principles outlined in the copending application, Serial Number 121,791 filed on July 3, 1961, and assigned to the same assignee as this invention, and reference may be had to that application for detailed description of the basic oscillator. Oscillator 6 is a negative resistance oscillator in which the resistance looking into both sides of the oscillator is negative. It has been discovered that such an oscillator is capable of sustaining oscillations simultaneously at two different frequencies by taking advantage of the facts that an inductance at low frequencies acts as a capacitance at high frequencies and that a series connection of a capacitor and inductance is capacitive at low frequencies and becomes inductive at high frequencies. For efficiently sustaining low frequency oscillations, oscillator 6 must have an inductive reactance in the emitter-base circuit of transistor 10 and a capacitive reactance in the collector-base circuit. These conditions for low frequency are satisfied by the connections shown in the drawing with the primary winding of transformer 18 being connected in the emitter-base circuit and capacitor 15 and the primary winding of transformer 16 being connected in the collector-base circuit. These same connections also satisfy the conditions for sustaining high frequency oscillations where transistor 10 must have a capacitive reactance in the emitter-base circuit and an inductive reactance in the collector-base circuit. For both high and low frequency operation the reactance in the emitter-collector circuit must be equal in magnitude and opposite in sign to the reactance in the collector-base circuit. This condition is also fulfilled by the circuit shown in the drawing. Of course, in order for the primary windings of transformers 12, 16, and 18 to act as inductances in the circuit, the secondaries must be lightly loaded. Oscillator 6 then oscillates simultaneously at a high and a low frequency, the output appearing as a high-frequency signal modulated by the low-frequency signal.

These two frequencies are utilized and separated by the choice of the circuit elements connected to the outputs of the oscillator. Voltage step-up transformers 12, 16, and 18 generally require moderately high frequencies for effective operation and thus are responsive to the high frequency signal. The mechanical characteristics of switch 8 are chosen to be such that these same high-frequency oscillations will have no effect, but that the low-frequency signal will cause periodic operation of the switch in synchronism therewith. Thus the transformers 12, 16, and 18 and switch 8 tend to act as high and low-pass filters, respectively. In an actual system constructed as shown in the drawing, step-up transformers 12, 16, and 18 required frequencies higher than 200 c.p.s. for efficient operation. The high frequency of oscillator 6 was 500 c.p.s. which easily satisfied the transformer requirements. A relatively low pulse rate was desired, of the order of 60 to 80 c.p.s., and switch 8 was a conventional mercury-wetted reed in a coaxial line. Such a switch is insensitive to frequencies above 100 c.p.s. so the high-frequency oscillations had no effect on it. However, the low-frequency signal was 72 c.p.s. and this signal caused synchronous operation of the switch to give the desired results.

The desired high-voltage to be used for the pulses is obtained by connecting the secondary windings of voltage step-up transformers 12, 16, 18, in series to provide the initial voltage increase. This stepped-up voltage is then supplied to the conventional voltage doubling rectifier 19, the output of which is the desired high D.-C. voltage required for the load pulses. This high D.-C. voltage is passed through variable attenuator and compensation circuit 21, which allows load voltage adjustments to the proper value while maintaining a constant input resistance, and resistor 30 to switch 8 which is operated at the low-frequency output of the oscillator. Resistor 30 has a high value of resistance so that load 22 sees essentially an open circuit looking back into the remainder of the system. The output from switch 8 is a series of high-voltage D.-C. pulses which are applied to load 22. The polarity of the pulses applied to load 22 may be reversed by means of double-pole double-throw switch 20.

Indicator circuit 24 consumes very little power and provides the operator with a positive indication that the system is energized and oscillator 6 is operating. Output oscillations of oscillator 6 are supplied through voltage step-up transformer 28 to rectifier 27 where they are rectified to provide a charging voltage for capacitor 26. When the voltage on capacitor 26 reaches the breakdown voltage of neon glow lamp 25, the lamp fires, discharging capacitor 26. The circuit is adjusted so that the lamp fires about once every three seconds, thereby drawing negligible power.

It should also be noted that capacitors 11, 15, 17, and 29 prevent D.-C. current from flowing through miniaturized transformers 12, 16, 18, and 28. This is necessary in order to avoid saturation of the transformers.

In the embodiment shown in the drawing switch coil 7 has been placed in series with the D.-C. input for two reasons; first, to isolate the battery 1 from the remainder of the circuit as previously described, and second, to obtain a necessary D.-C. bias for the particular switch used in this example. If such bias is not needed, or if separate biasing means are provided for the switch contacts, switch coil 7 could be placed across the emitter-collector path of transistor 10 and a separate inductance used to provide the described isolation of the battery.

It is also apparent that if higher voltage multiplication were desired than that provided by doubler 19, other voltage multiplying rectifiers giving higher multiplications could be used. A PNP transistor could be substituted for NPN transistor 10 by reversing the polarities shown. The specific embodiment of the invention shown in the drawing is merely illustrative of the principles of the invention, and various changes and modifications may be made without departing from the spirit and scope of the invention as set forth in the appended claims.

What is claimed is:

1. A pulse generating system including a low-voltage D.-C. supply, dual frequency oscillator means connected to said D.-C. supply means for providing first and second oscillation signals, voltage multiplying and rectification means coupled to said oscillator, switch means coupled to said oscillator, and a load, said first oscillation signal being supplied to said voltage multiplying and rectification means the output of which is connected to said load through said switch means, said second oscillation signal being used to operate said switch means.

2. A pulse generating system for producing high-voltage D.-C. pulses from a low-voltage D.-C. source including a dual frequency oscillator energized by said low-voltage source, said oscillator producing first and second oscillation signals, voltage multiplying and rectification means coupled to said oscillator, a switch coupled to said oscillator, and a load, said voltage multiplying and rectification means being connected in series with said switch and said load and being energized by said first oscillation signal, said second oscillation signal being connected to and causing periodic operation of said switch.

3. A pulse generating system according to claim 2 wherein said first oscillation signal is of higher frequency than said second oscillation signal.

4. A pulse generator for producing high-voltage D.-C. pulses from a low-voltage D.-C. source including a dual frequency transistor oscillator energized by said low-voltage source, said oscillator having output oscillations in the form of a high-frequency signal modulated by a low-frequency signal, a coil operated switch, a load, a voltage multiplication and rectification circuit connected to the output of said oscillator and being responsive to said high-frequency signal to supply a high D.-C. voltage to said load through said switch, said coil of said switch connected to the output of said oscillator and being responsive to said low frequency signal only thereby causing periodic operation of said switch at said low frequency.

5. Apparatus for generating regularly recurring high-voltage D.-C. pulses from a low-voltage D.-C. source including a voltage regulating circuit for stabilizing the output from said D.-C. source, a switch having an energizing coil, an oscillator connected to the output of said regulating circuit through said energizing coil, said oscillator having an output signal in the form of a high frequency signal modulated by a low frequency signal, voltage rectifying and multiplying means coupled to the output of said oscillator and being responsive to said high-frequency signal to provide a high-voltage D.-C. output, and a load connected to said high-voltage D.-C. output through said switch, said energizing coil of said switch being responsive to said low-frequency signal only.

6. A pulse generating system including a low-voltage D.-C. supply, dual frequency oscillator means connected to said D.-C. supply means for providing first and second oscillation signals, voltage multiplying and rectification means coupled to said oscillator, switch means coupled to said oscillator, load means, means attenuating said second oscillation signal and passing said first oscillation signal to said voltage multiplying and rectification means the output of which supplies a high voltage direct current to said load means through said switch means and means attenuating said first oscillation signal and being energized by said second oscillation signal to operate said switch means.

7. The device of claim 6 wherein said oscillator means comprises a single electronic amplifying element.

References Cited by the Examiner

UNITED STATES PATENTS

| | | | |
|---|---|---|---|
| 2,828,450 | 3/58 | Pinckaers | 307—88.5 |
| 2,924,723 | 2/60 | Van Overbeek | 307—88.5 |
| 2,990,517 | 6/61 | Grieg | 321—2 |
| 3,005,163 | 10/61 | Dulberger et al. | 321—2 |
| 3,096,472 | 7/63 | Elliott | 307—88.5 |

MILTON O. HIRSHFIELD, *Primary Examiner.*

GEORGE J. BUDOCK, *Examiner.*